(12) United States Patent
Duffett-Smith et al.

(10) Patent No.: US 8,279,116 B2
(45) Date of Patent: Oct. 2, 2012

(54) PROCESSING RECEIVED SATELLITE RADIO SIGNALS

(75) Inventors: Peter James Duffett-Smith, Cambridge (GB); Robert Willem Rowe, Cambridge (GB); Anthony Richard Pratt, Northampton (GB)

(73) Assignee: Cambridge Positioning Systems Limited, Cambridge (GB)

( * ) Notice: Subject to any disclaimer, the term of this patent is extended or adjusted under 35 U.S.C. 154(b) by 84 days.

(21) Appl. No.: 12/865,387

(22) PCT Filed: Jan. 7, 2009

(86) PCT No.: PCT/EP2009/050093
§ 371 (c)(1),
(2), (4) Date: Jul. 29, 2010

(87) PCT Pub. No.: WO2009/103570
PCT Pub. Date: Aug. 27, 2009

(65) Prior Publication Data
US 2010/0295727 A1    Nov. 25, 2010

(30) Foreign Application Priority Data

Feb. 20, 2008    (EP) .................................... 08101774

(51) Int. Cl.
*G01S 19/37* (2010.01)

(52) U.S. Cl. ................................................ 342/357.77
(58) Field of Classification Search ... 342/357.2–357.78
See application file for complete search history.

(56) References Cited

U.S. PATENT DOCUMENTS

| | | | |
|---|---|---|---|
| 6,091,785 A | 7/2000 | Lennen | |
| 6,965,631 B2 * | 11/2005 | Shakeri et al. | 375/142 |
| 2011/0128998 A1 * | 6/2011 | Stahlberg et al. | 375/147 |

FOREIGN PATENT DOCUMENTS

EP    1 843 167 A1    10/2007

* cited by examiner

*Primary Examiner* — Gregory C Issing
*Assistant Examiner* — Nga X Nguyen
(74) *Attorney, Agent, or Firm* — Roylance, Abrams, Berdo & Goodman, LLP (57) ABSTRACT

A method of processing received satellite radio signals is disclosed in which signals are received the signals from plural satellites through a common antenna. The received signals are digitised to produce a time-series of digitised signal samples and a plurality of replicas representing the signals of each of the plurality of satellites are obtained. At least one sample is selected from each of the replicas and the elements of a register are set equal to the selected replica samples. Thereafter, in turn, for each one of said digitised signal samples, the value of the digitised signal sample is combined with each of the values of the elements of the register to produce corresponding modified values; and the modified values corresponding to each of said register elements are accumulated.

11 Claims, 4 Drawing Sheets

PROCESSING RECEIVED SATELLITE RADIO SIGNALS

FIELD OF THE INVENTION

The invention relates to satellite navigation systems in general, and in particular to the processing of data samples using a software or firmware program in a radio receiver able to receive and process the satellite signals.

BACKGROUND AND PRIOR ART

Navigation Satellite Systems use the Aeronautical Radio Navigation Systems (ARNS) and Radio Navigation Satellite Systems (RNSS) wireless bands to provide protected ranging signals by which a specialised wireless receiver determines the location of its antenna. The Global Positioning System (GPS) is one example of a deployed Global Navigation Satellite System (GNSS).

GPS comprises space, control and user segments. The space segment consists of a number of orbiting satellites (otherwise known as space vehicles; SVs), each emitting several ranging signals, and the signals from several satellites are used together to determine the locations of the many receivers used in the control and user segments. The control segment measures the ranging signals from the visible constellation of satellites and uses the data to determine the historic orbits of the satellites in the constellation. The algorithms also use information about forces which each satellite experiences in order to form models describing the near-term future orbital behaviour of each satellite. The orbit predictions are converted into a set of parameters describing a close approximation to the orbit. The parameters are transmitted to each satellite and stored in the internal satellite memory for subsequent retransmission by the satellite during their period of validity. Each set of orbit prediction parameters relates to a specific part of the orbit which these model with least error. Such parameters are generally known as the ephemeris parameters. For GPS and Galileo, another GNSS system under development, a modified Kepler model is used as the basis for the parameter set.

The satellites also transmit clock parameters describing the behaviour of the atomic clock which is carried by each satellite. The drift of the satellite clock with respect to the GPS time reference is described by a three-parameter model comprising the satellite clock time offset from the global time reference for the GNSS system, a drift rate, and a drift acceleration parameter. For GPS, the global time reference time is held, at least, in an ensemble of clocks, some of which are located at the United States Naval Observatory in Washington, D.C.

The operation of the GPS satellite navigation system will now be described as an example of a GNSS system to which the current invention relates. The space segment consists of a minimum constellation of 27 active satellite and some active spares, totaling 31 satellites in October 2007. Whilst satellites have a design lifetime exceeding 7 years, many achieve longer lifetimes before failures lead to loss of control or function. The average life of satellites in the current constellation is approximately 8.7 years. The satellites are located in 6 orbital planes inclined at 55° to the Earth's equatorial plane. Each satellite executes an orbit in 12 hours sidereal time (not Earth's solar time scale). In ideal circumstances, satellites would be positioned in a regular angular disposition around each orbit, that is every 72°, but in practice active spare satellites are often purposefully pre-positioned close to ones expected to fail in the near term.

GPS receivers determine their positions by computing time delays between transmission and reception of signals transmitted from the satellites and received by the receiver on or near the surface of the Earth. The transmission time delays (through multiplication by the speed of radio waves) provide good approximations to the distances between a receiver and the respective satellite. Each satellite broadcasts a ranging signal, in the form of a direct-sequence spread-spectrum code, which serves both to identify the satellite and to carry pre-determined epochs in each satellite. The epochs are events associated with the transition of the satellite code generators to a specific state in the code sequence. The epochs serve to identify the time of transmission of a signal. The receiver uses the epoch to establish the instant of reception with respect to a local receiver clock.

GPS satellites also broadcast a data message containing the ephemeris parameters for each satellite orbit, and the satellite clock correction parameters. The data message includes a time message (for example, the so-called z-count in GPS) which identifies the transmission time (according to the satellite clock) of a specific event or identifiable epoch in the satellite broadcast. This data is included in the hand-over word (HOW) in the Coarse/Acquisition (C/A) message. The z-count identifies the instant of time corresponding to the data-bit transition at the start of the next sub-frame of data. This time signal allows the receiver to determine unambiguously a time-tag for the time of reception of this event. By knowing the corresponding time of transmission of each of the signals, the receiver can determine the range to the satellite, whilst also using the ephemeris data to calculate the satellite's position when it transmitted its signal. Finally, the receiver combines the knowledge of satellite positions with the determined ranges to calculate the receiver's position.

Each satellite transmits ranging signals as binary phase-shift keyed (BPSK) modulation on a carrier component. The ranging signals are characterised by a spreading code of known duration for which a replica (known herein as a satellite code replica) can be generated in a receiver. For each element of the spreading code, a spreading symbol is transmitted whose binary sign is determined by the state of the spreading code for the specific time of transmission. The spreading symbol is a rectangular pulse for signals such as the GPS C/A code and the GPS encrypted precise (P(Y)) code. New signals include the so-called L2CM/CL codes and M-codes, for which the spreading symbols are different. The large difference between the message-data rate (tens of Hertz) and spreading-code rate (MHz) permits the use of phase-shift keying for both types of modulation at the same time on the same carrier.

The search and acquisition process for GPS signals, and the reading of the ephemeris and clock data, is time consuming and introduces delays in computing the receiver's position. In addition, there is often blockage of the satellite signals, caused, for example, by building or foliage obscuration, or as a result of operation inside a building where is there is no direct line of sight to any satellite. In these cases, the received signal level can be too low to demodulate and derive the satellite data without error. However, even in these degraded signal situations, the receiver is often still able to track the satellite signals. The measurement of time delay remains possible even at low carrier-power-to-noise-power-density ratios ($C/N_0$). Location solutions may be derived in such cases using aiding data from an external source of ephemeris and time data, for example, supplied by a two-way wireless or cellular communications link. In addition, the time required to acquire the satellite signals and decode the data message may be reduced by accepting versions of the data message from alternative sources such as described above.

GPS aiding requires external knowledge of the absolute time within an accuracy of one to ten milliseconds, so that the satellite positions can be determined accurately. Many wireless communications systems cannot provide this accuracy of time synchronisation. For example, the AMPS cellular phone system does not support time information, nor (currently) does the North American TDMA cellular phone system. The CDMA cellular system supports time aiding as the each base station is operated in a synchronous regime. The CDMA system uses GPS receivers to provide time references which synchronise the CDMA system. The GSM cellular phone system can support timing information, but only with the addition of external equipment (Location Measurement Units, LMUs) because the base stations are asynchronous. Alternatively, Enhanced GPS (EGPS) provides a solution for time transfer in asynchronous systems such as GSM, using the base-station clocks as a repository for GPS time, once acquired. The stability of these clocks has been shown to provide acceptable time recovery almost indefinitely. At the same time, EGPS allows each mobile station (MS) to roam in the network whilst carrying its own position. If required, EGPS ranging capabilities allow for the determination of the MS position and the calibration of previously un-calibrated base-station clocks Each transmitted GPS signal is a direct-sequence spread-spectrum signal. Broadcasts are made currently on two frequencies denoted L1 (1575.42 MHz) and L2 (1227.60 MHz). Some of these signals have been made available for civil use and are known as the Standard Positioning Service. Mostly available on L1, these utilize a spreading code with a 1.023 MHz spreading rate. Each satellite transmits its own unique pseudo-random code (drawn from a family of so-called Gold codes) that identifies the particular satellite, and allows signals transmitted simultaneously from several satellites to be received simultaneously by a single receiver with little interference to any one signal by the others. The C/A pseudo-random number (PRN) code sequence length is 1023 chips, corresponding to a one-millisecond time period. Each received GPS signal is constructed from the repetitive PRN pattern of 1023 chips transmitted at a rate of 1.023 MHz. At very low signal levels the PRN pattern may still be observed to provide unambiguous time delay measurements through averaging many PRN frames. The transmission time delays measured at the receiver are called "sub-millisecond pseudo-ranges", since they are known modulo the one millisecond PRN sequence frame boundaries.

A minimum of four pseudo-ranges, together with the transmissions times, is sufficient to solve for the position of the GPS receiver. In the GPS system, the times of transmission are broadcast from the satellites in the navigation message, superimposed on the 1.023 MHz PRN code at a data rate of 50 Hz. This is a BPSK data stream with data-bit transitions aligned with the beginning of the PRN frame. There are exactly 20 PRN code frames per data bit period.

The satellite transmission time is determined in conventional GPS receivers by reading the time-of-week (TOW) data in the GPS navigation message. In the standard method of time determination, a conventional GPS receiver decodes and synchronizes with the 50-Hz data stream. The data signal is arranged into 30-bit words grouped into sub-frames of 10 words, with a length of 300 bits and a duration of six seconds. Five sub-frames comprise a frame of 1500 bits and a duration of 30 seconds, and 25 frames comprise a super-frame with a duration of 12.5 minutes.

The GNSS receiver must initiate an acquisition process to establish coarse parameters describing the states of the received satellite signals. These parameters are used to initialise higher-precision signal-parameter estimation through the use of signal-tracking loops. The higher-precision parameters are then used in the navigation solution. Conventionally, the processing is carried out in dedicated hardware, often consisting of banks of correlators, in order to complete the acquisition process within a reasonable time. Such hardware may be an expensive addition to a mass-market terminal such as a mobile phone. However, some or all of this processing may also be performed in a general-purpose processor provided in the mobile phone. Crucial to the success of such an implementation is the efficient use of the processor design, to best conform with the size of its registers, the particulars of its instruction set, and the capabilities of its data-bus.

In the known prior art, e.g. U.S. Pat. No. 7,010,060 (Ledvina et al.), a real-time software receiver is disclosed which uses so-called "bit-wise parallelism" to perform the functions of hardware correlation, base-band mixing and PRN code correlation using data acquisition and correlator modules which operate on a general purpose processor. Ledvina et al. teach an RF processor producing digitised signal samples of a received signal containing the transmissions from visible GPS satellites. Plural signal samples are processed simultaneously by placing them sequentially in a given word of computer data memory, and then in additional words. For example, if the computer word has 32 bits and the digitised GPS signal samples have been converted using a 1-bit analogue-to-digital converter (ADC), then 32 samples in sequence can be stored in each computer data memory word. Samples of a satellite signal replica are tabulated or generated in real time and can be indexed to provide rapid access. Bit-wise parallelism saves computational time by enabling a required operation, say between a set of input data samples and a stored satellite signal replica, to be performed as an operation between two words, rather than the bits or samples individually.

In forming the algorithms required in a bit-wise parallelism regime, there is a complicated set of register allocation algorithms which is also required. Furthermore, the computation of the correlation sums has to be done by a computationally-intensive method. There is a need to reduce further the processor load and it is therefore a goal of the present invention to eliminate or reduce the computation burden of a number of these tasks.

SUMMARY OF THE INVENTION

According to the invention there is provided a method of processing received satellite radio signals, comprising the steps of receiving the signals from plural satellites through a common antenna; digitising the received signals to produce a time-series of digitised signal samples;

obtaining a plurality of replicas representing the signals of each of said plurality of satellites;

selecting at least one sample from each of said replicas;

setting elements of a register equal to said selected replica samples; and in turn, for each one of said digitised signal samples,
combining the value of said digitised signal sample with each of the values of the elements of the register to produce corresponding modified values; and
accumulating the modified values corresponding to each of said register elements.

The invention also includes the step of processing the accumulated values to determine the position of the common antenna.

The method of determining the position of the common antenna from the accumulated values is well known in the art (see for example "Global Positioning System: Theory and Applications Volumes 1 & 2", Parkinson & Spilker, Eds.).

An advantage of the present invention is that it provides an efficient method of carrying out plural computations, and this is achieved by using each data sample individually in parallel computations with plural satellite signal replica samples.

The satellite radio signals are received by an antenna connected to a hardware device and processed immediately by a software or firmware program running on a processor, or stored in memory for later processing, either in digital or analogue form. The signal may be transmitted by a satellite of a GNSS positioning system, such as GPS or Galileo. Other systems include GLONASS, Bidou, QZSS, Compass etc. The hardware device may have one or more analogue stages, such as the filters, amplifiers, mixers and oscillators usually found in radio receivers.

Digitisation of the received signal may be carried out after mixing to baseband, or at an intermediate frequency, or may be carried out directly at the received radio frequency. There are many options, known in the art, for forming digitised samples of the input signal. One such example uses a sampling ADC with a sampling frequency close to four times the intermediate frequency, producing a stream of in-phase (I) and quadrature-phase (Q) samples that can be subsequently separated, thereby performing a mixing and digitisation processes together. The digitised samples may have one or more bits of signal representation. In some applications, the digitiser produces multi-bit samples at a first sampling rate which are subsequently reduced in precision and decimated to produce samples with only one or a few bits of precision at a lower sampling rate. Separate digital data streams may be produced representing I and Q signals, which may be kept separate, or interleaved, or otherwise combined into a single data stream. In a particular application, each I and Q data sample is made at the same time; in another, a single digitiser produces interleaved I and Q samples directly by sampling at two instances spaced a quarter of a cycle apart. In other implementations having sufficient signal-phase accuracy, a single sample stream may be sufficient to represent the received radio signal.

The radio receiver may also operate on more than one frequency channel simultaneously. For example, in a GPS system, it may be advantageous to receive and sample both the L1 and L2 signals. Multi-frequency operation may also be possible in other satellite navigation systems. The present invention may be applied to both civilian and non-civilian signals, or to both the civilian and non-civilian signals simultaneously. In GPS, the civilian code is generally referred to as the C/A code and has a chip rate of 1.023 M samples $s^{-1}$. The GPS signals reserved for authorised or military users include the P or P(Y) and M-code signals, and have chip rates which are five to ten times faster.

One of the requirements of a satellite navigation system receiver is to perform a computation, such as a cross-correlation, between the received signal and a replica of the signal corresponding to a particular satellite. In all current GNSS systems, measurements to more than one satellite are required to provide for the process of multi-lateration. Consequently, in such systems it is necessary to use a plurality of satellite signal replicas.

The following mathematical representation illustrates a method of the invention. Let $d_i$ represent the $i^{th}$ received signal sample ("data samples") in a discrete time sequence of received signal samples given by $\{d_i\}=d_1, d_2, d_3, \ldots$ etc. Let $s_{mn}$ represent the $n^{th}$ sample in a time-ordered sequence of samples of the satellite signal replica for the $m^{th}$ satellite, that is $\{s_{mn}\}=s_{m1}, s_{m2}s_{m3} \ldots s_{mN}$, where N is the total number of samples in the replica. A GPS receiver, using the C/A code and, by way of example, having samples spaced half a chip apart, would have N=2048. In general, the number of stored samples is determined by the requirement to store a sufficient representation of both the code sequence and the residual intermediate-frequency and Doppler-frequency offset. In the most general case, every $d_i$ must be combined with every $s_{mn}$ according to a prescribed operation, or mapping, an example of which is a multiplication operation required as part of a correlation process, operative on signals in a $\{-1,+1\}$ domain. In a logic-driven processor, where the samples are specified in a $\{0,1\}$ domain, the multiplication process is equivalent to an exclusive-OR operation (see below). A conventional approach is to process a sequence of N data samples with each satellite signal replica separately at every offset, k. If $(d_1,s_{m1})$ represents the combining of received signal sample $d_1$ with satellite signal replica sample $s_{m1}$, and square braces, [ . . . ], indicate the sum of the enclosed results, the conventional approach may be represented by $[(d_1,s_{m1}), (d_2, s_{m2}), \ldots (d_N,s_{mN})]$, then $[(d_1,s_{m2}), (d_2,s_{m3}), \ldots (d_N,s_{m1})], \ldots [(d_1,s_{m1}, k), (d_2,s_{m2}+k), \ldots (d_N,s_{m|N+k|})], \ldots [(d_1,s_{mN}), (d_2,s_{m1}) \ldots (d_N,s_{mN-1})]$, a total of N sums for each satellite. (The vertical bars, |...|, indicate that modulo N of the quantity enclosed by the bars should be taken). This provides for the circular combining of the data and the stored satellite signal replica samples, resulting from the repetition of the transmitted signals from each satellite). The whole process is repeated with each of the satellite signal replicas, giving M×N sums for a total of M satellites.

The present invention provides for the combination of each received signal sample individually with all of the satellite signal replicas taken together. Thus the $i^{th}$ received signal sample, $d_i$, is combined, for example, with the $j^{th}$ satellite signal replica sample for every one of the satellites, that is $(d_i,s_{1j}), (d_i,s_{2j}), \ldots (d_i,s_{Mj})$. In one example of this method, each of the relevant samples of the satellite signal replica are placed in sequential bit locations in one or more computer words. In an example case using a 1 bit representation for the received signal samples, the contents of the word or words holding the samples of the satellite signal replica are either inverted or not inverted depending upon the sign of the received signal sample. Finally, each combination is added to the appropriate sum, one for each satellite at each offset (in the most general case), giving a total of M×N sums as before. However, the re-ordering brings significant practical benefits as seen later.

The received signal samples may be used directly in the method of the invention, or may first be processed. For example, a transformation such as a Fast Fourier Transform (FFT) may be applied to a block of received signal samples thereby converting the data representation from the discrete time domain into data representation in another domain. An FFT produces the spectrum of the received signals in the discrete frequency domain, but other transformations are possible, such as number-theoretic transforms. The method of the invention may form part of the transformation process, or may be applied after such a transformation.

The satellite signal replica samples may be loaded into the elements of one or more registers, so that each register contains replica samples from plural satellites. In one scheme, the first element of a register is set to the first satellite signal replica sample of the first satellite, the second element is set to the first satellite signal replica sample of the second satellite, the third element is set to the first satellite signal replica sample of the third satellite and so on. By this means, the register is loaded with the satellite signal replica components thus: \$s_{11}$, $s_{21}$, $s_{31}$, ... $s_{R1}$\, where the back-slants, \ ... \, represent a register with R bits. In another scheme, suitable for tracking satellites already acquired by the receiver, the first, second, and third elements of a register are set to the values of early (e), prompt (p), and late (l) satellite signal replica samples respectively of a first satellite, elements four, five, and six are set to early, prompt and late satellite signal replica elements of a second satellite and so on, thus: \$s_{1e}$, $s_{1p}$, $s_{1l}$, $s_{2e}$, $s_{2p}$, $s_{2l}$, ...\. In yet another scheme, very-early, early, prompt, late, and very late replica samples are used for each satellite, and in another just the early and late replica samples are employed. Clearly, many schemes are possible, but the inventive concept is that individual received signal samples are processed, one at a time, with plural relevant satellite signal replica samples in parallel.

The register may be of any sort, whether implemented in hardware or in software. The benefits of the current invention, however, are maximised when the register length is optimised for the particular processor in use. For example, a processor which uses an instruction set based on thirty-two bit operations is most efficient with instructions operating upon registers of thirty-two bits in length (R=32). The instruction set may contain a single instruction which forms the product of corresponding bits of a first and a second thirty-two bit register, placing the products in the elements of a third thirty-two bit register. The first register could then be set to contain the same received signal sample at every element, \$d_i$, $d_i$, $d_i$, ...\ and the second one set to contain early and late satellite signal replica samples for sixteen satellites, \$s_{1e}$, $s_{1l}$, $s_{2e}$, $s_{2l}$, ... $s_{16e}$, $s_{16l}$\. The single instruction would fill the elements of the third register with the corresponding products, \($d_i$,$s_{1e}$), ($d_i$,$s_{1l}$), ($d_i$,$s_{2e}$), ($d_i$,$s_{2l}$), ... ($d_i$,$s_{16l}$)\. In many cases, as shown below, it is unnecessary to fill the elements of the first register with the received signal samples, especially if the operation is performed 'in place' with the result replacing the values in the second register, and no third register.

In some implementations, it may be an advantage to incorporate one or more special instructions into the instruction set of the processor for carrying out the particular operations required by the invention in the most-efficient manner. The current invention includes modifying the instruction set in this manner.

In one such example according to the invention, an instruction is one which causes the contents of the $n^{th}$ bit in each of a range of registers or memory elements to be accumulated. Thus if bit number r in each of ten identified memory locations contained the values {0,1,1,0,1,0,0,1,1,1}, then the proposed instruction would provide the value 6 (being the sum of the '1' contents) or the value −2 (being the sum of the '0' value components minus the sum of the '1' value components) according to the value of a received signal sample. In a further, more-complex instruction, each of the like-numbered bit values is processed in this way resulting in values loaded into 32 registers, one for each bit location in the original identified memory locations. Such an operation provides for the accumulation of correlation values. As will be seen below, the potential for addition of computationally-efficient instructions for signal processing in a general purpose processor is not limited by the above example.

The operation to be performed between each received signal sample, $d_i$, and each satellite signal replica sample, $s_{mn}$, may take one of several forms depending on the requirement. For example, the operation (or mapping) may be equivalent to the exclusive-OR function. If single-bit samples are used, represented by a one (1) or a zero (0), this function produces a 1 only when either $d_i$ or $s_{mn}$ is set to 1, but not both, otherwise it produces a 0. If the result of the function replaces the value of $s_{mn}$, then the replacement need only take place when the value of $s_{mn}$ is different from the result. This only occurs if $d_i$ is 1. An efficient algorithm for this mapping would therefore be as follows:

if $d_i$ is a 0—no operation;

if $d_i$ is a 1—invert the value of $s_{mn}$ (that is, apply the NOT function).

Note that the received signal sample needs only to be tested for whether it is a 1 or a 0, saving the loading of a register with its value. Half the time, there is no operation to perform (assuming that the data stream contains as many ones as zeroes). This represents a significant saving of processor computational load for one of the more intensive signal processing tasks in GPS signal reception.

In another example, complex representations of $d_i$ and $s_{mn}$ are multiplied together. Each is represented by two bits, with one bit for the real part (R) and one for the imaginary part (I). The result of the multiplication has a real part given by ($d_{iR} \times s_{mnR} - d_{iI} \times s_{mnI}$) and an imaginary part of ($d_{iR} \times s_{mnI} + d_{iI} \times s_{mnR}$). With one-bit representation for each of the real and imaginary parts of $d_i$ and $s_{mn}$, the result has just four possible complex values, and these may be mapped back to a complex output with one bit representing each of its real and imaginary parts. An efficient algorithm for this mapping would be as follows:

if $d_{iR}$ and $d_{iI}$ are both a 0—swap the real and imaginary parts of $s_{mn}$ and then invert the new imaginary part;

if $d_{iR}$ is a 0 and $d_{iI}$ is a 1—invert both the real and imaginary parts of $s_{mn}$;

if $d_{iR}$ is a 1 and $d_{iI}$ is a 0—no operation;

if $d_{iR}$ and $d_{iI}$ are both a 1—swap the real and imaginary parts of $s_{mn}$ and then invert the new real part.

Thus the complex multiplication has been reduced to a swap, and/or a NOT (invert) operation based on the result of a test of the real and imaginary bits of a received signal sample, with no operation at all in a quarter of the cases.

As already noted, the received signal samples and satellite signal replica samples may be represented by more than one bit, for both the real and imaginary parts. The corresponding algorithms have greater complexity as the number of bits increases, but the saving in processor time can still be considerable, especially if specialised processor instructions are available. In some cases, it may be best to use more than one mapping—that is to use a first mapping to produce an intermediate result, followed by one or more second mappings to produce the final result. The different mappings may be contained in a table of mappings, with a look-up procedure. The complex one-bit multiplication algorithm given above uses a swap operation (first mapping) followed by an invert operation (second mapping) in two of the steps. Complex multiplication using more than a single bit to represent the real and imaginary parts may be broken down into a series of mapping steps. In may also be an advantage, in some applications, to select from the table one or more mappings which depend on both the current received signal sample and on one or more previous received signal samples, or on accumulated values. One or more mappings may combine non-concurrent samples.

BRIEF DESCRIPTION OF THE DRAWINGS

Examples of methods according to the invention will now be further described with reference to the accompanying drawings, in which.

DETAILED DESCRIPTION OF THE EXAMPLES

Figure 1:
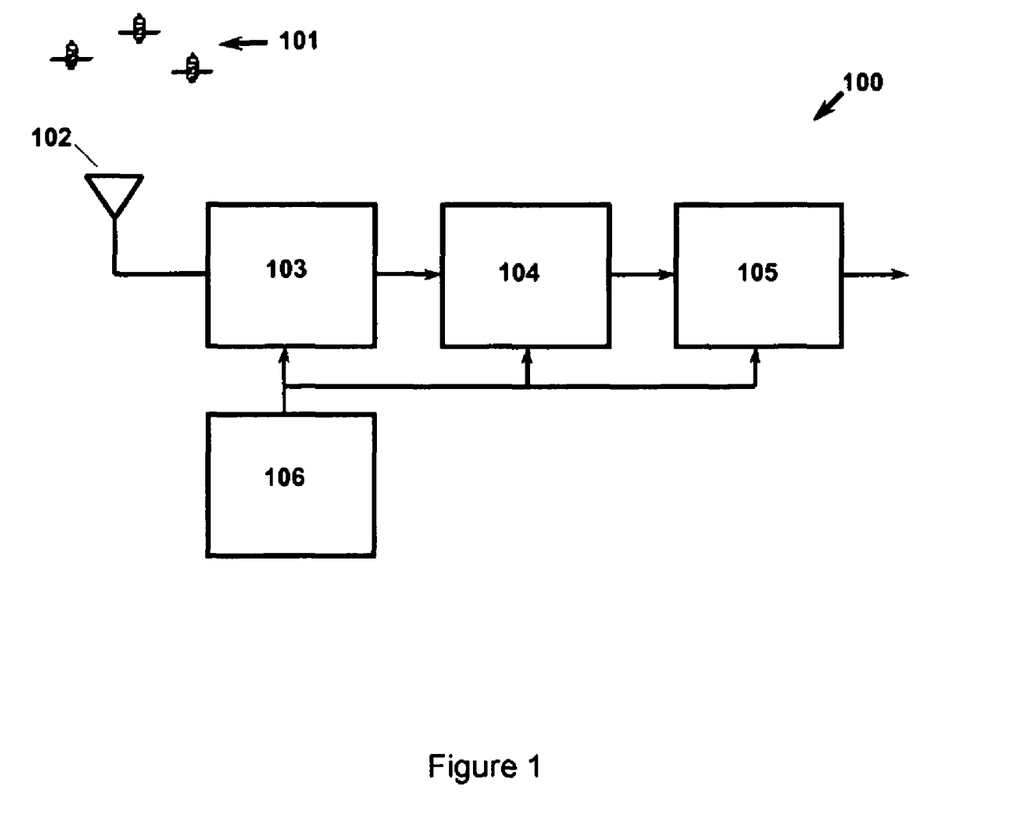
FIG. 1 illustrates a GPS receiver.

A GPS receiver 100 is shown in outline in FIG. 1. Signals from GPS satellites 101 are picked up by antenna 102 and passed to the radio frequency (RF) and intermediate frequency (IF) processor 103. Here, the signals are amplified, filtered and converted to base-band, or a frequency close to base-band, in the usual manner common in radio receivers, and then passed to digitiser 104. I and Q one-bit data samples (one bit representing each of I and Q) are passed to processor 105 where they are processed according to the method of the invention. An oscillator 106 provides the local-oscillator reference signal for the RF/IF processor 103, the clocking reference signal for the digitiser 104, and the clock signal for the processor 105.

The GPS receiver 100 works in various modes depending on its current state. Here we consider acquisition mode and tracking mode.

During acquisition (that is, when the receiver is in acquisition mode), the receiver 100 must find and acquire satellite signals in order to be able to measure the time of flight, and hence distance, from the antenna 102 to each satellite 101. The acquisition process (carried out in processor 105) establishes coarse estimates of the satellite signal parameters at the receiver antenna 102, such as frequency with Doppler offset, code phase relative to the code epoch or the receiver clock time, signal strength, etc. Once a satellite has been acquired, it may then be tracked by various types of tracking processes which operate to refine the parameter measurements which are then used in a navigation solution to find the position of the antenna 102. Acquisition of a satellite usually involves forming the cross-correlation between the received signal and a replica of the signal expected from a particular satellite. In the most general case, when the code-phase offset of a particular satellite's PRN code is not known, and when the frequency offset (caused both by the Doppler shift of the received signal and the frequency error of the reference oscillator 106) is known only within wide limits (±5 kHz is generally the worst case), the processor (105) must perform a two-dimensional search of the incoming received signal sample stream, both in code-phase offset and frequency offset. The problem is exacerbated by the satellite signals often being weak, requiring significant integration periods which may extend to several or many seconds in extreme cases. The various techniques and strategies are well-known in the art (see, for example, "Understanding GPS Principles and Applications", second edition, Kaplan & Hegarty, Artech House, 2006) and will not be further described here. The method of the invention concerns the particular way in which received signal samples from digitiser 104 may be processed efficiently in processor 105.

In one example of a receiver structure, consider first a search in code-phase offset, as part of an acquisition process, in which the satellite code offset is completely unknown. The residual Doppler frequency offset is assumed to be smaller than half the reciprocal of the signal integration time, so that the processed received signal samples have a near-zero-frequency offset during the acquisition process. In the particular implementation discussed here, the one-bit I and Q received signal samples are each produced at twice the chipping rate of the C/A code, so there are four signal samples per chip. The C/A code length is 1023 chips. It is therefore necessary to search over 2046 half-chip offsets in order to establish, without significant loss of sensitivity, a coarse estimate of the code phase of the received signal samples. In this example receiver, the received signal is sampled at a rate of 2.048 M samples $s^{-1}$ in each of the I and Q channels. Thus there are 2048 samples of the I signal and 2048 samples of the Q signal in each 1 ms interval. These are combined with sets of satellite signal replica samples taken at the same rate to form a cross-correlation coefficient value for every offset of the satellite replica. The choice of 2048 samples per 1 ms interval is an example only and may take other values, such as 5714. However, choices of the numbers of samples that are multiples of the number of code states, such as 2046 or 4092 may lead to poor estimation of the satellite signal caused, for example, by error limit cycles in the estimators (also known as 'dead bands'). Note should also be made of the requirement for a different set of satellite signal replica samples for each adjacent 1 ms of received signal samples.

Figure 2:
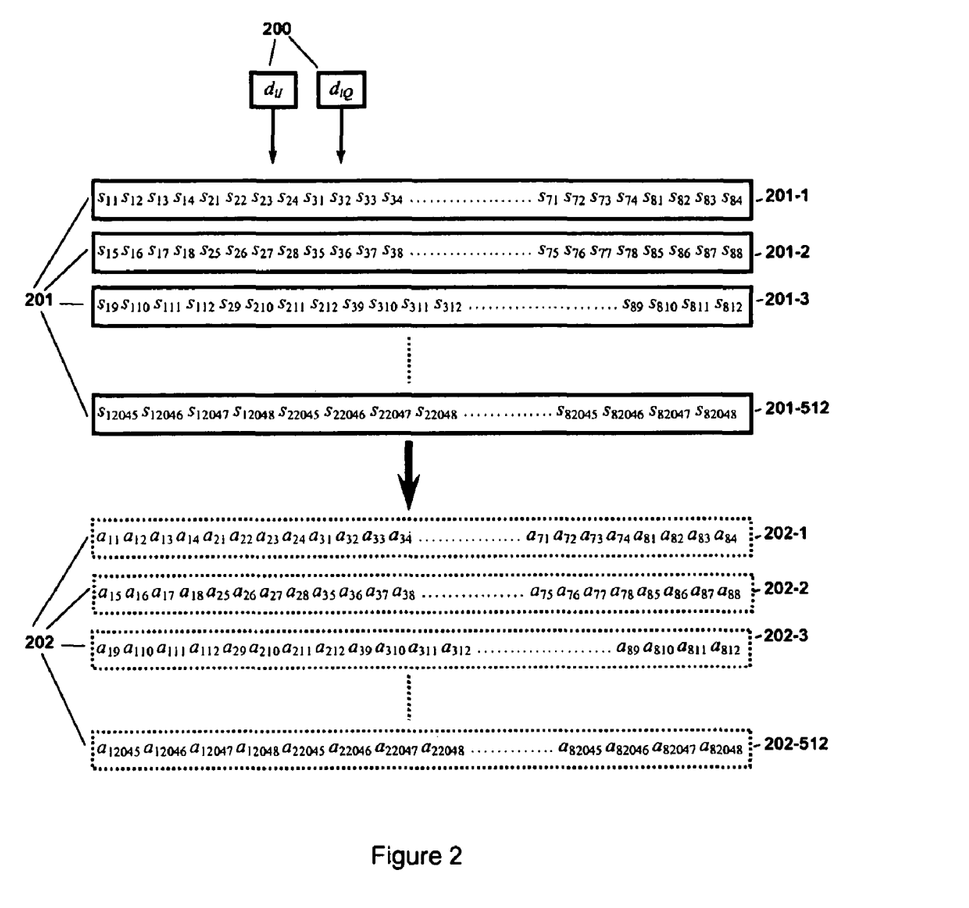
FIG. 2 shows bit settings in registers for acquisition.

In this particular implementation, in the processor 105 there are 512 thirty-two bit registers available to hold the satellite signal replica samples as shown in FIG. 2 at 201. Each solid rectangle represents one thirty-two bit register. It should be noted that, in this instance of near zero residual Doppler offset, the satellite signal replica samples are all real and are produced with an estimated residual frequency error of zero. In the example case, each of the satellite signal replica samples may, therefore, be represented by a single bit. Other schemes are possible, in which the received signal samples are represented by only real-value samples, such as $d_{iI}$, and the satellite signal replica samples by complex-value samples. This is required, for example, when the samples of the received signals are not within the frequency range of the zero Doppler offset estimated case. In yet further cases, both received signal samples and satellite signal replica samples are represented by complex values. The first four satellite signal replica samples of a first of the SVs 101 are placed in the bottom four bits of the first register 201-1, the first four satellite signal replica samples of a second of satellite 101 are placed in the next four bits and so on until the first register is full. Eight of the satellites 101 can be represented in this way. Samples five to eight of each of the satellite signal replicas are placed in a second register 201-2, samples nine to twelve in a third register 201-3 and so on as shown in FIG. 2.

Figure 3:
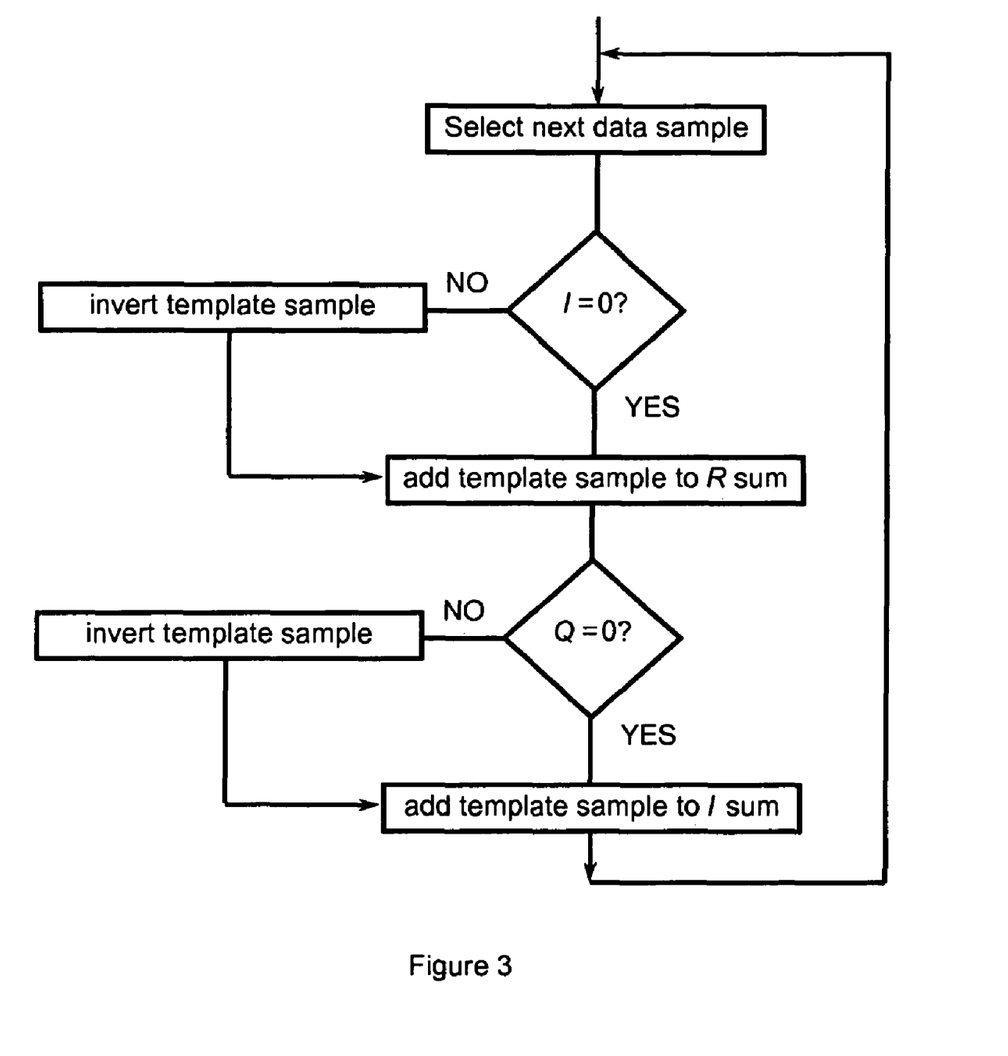
FIG. 3 is a flow chart of the 1-bit exclusive-OR operation.

The real (I) and imaginary (Q) received signal samples 200 are processed separately in the processor 105 with each of the bits in each of the registers 201. In this case, the exclusive-OR algorithm is particularly simple since the satellite signal replica samples are real. FIG. 3 illustrates the flow-diagram. If the $i^{th}$ I received signal bit is a zero, the satellite signal replica sample is added into the corresponding sum of real values. If it is a one, the satellite signal replica sample is first inverted before being added to the real-value sum. If the $i^{th}$ Q received signal bit is a zero, the satellite signal replica sample is added into the corresponding sum of imaginary values. If it is a one, the satellite signal replica sample is first inverted before being added to the imaginary-value sum. This algorithm can be implemented efficiently in processor 105 using register-wide instructions as noted previously.

The sums of the real and imaginary values are accumulated in groups of registers 202. Here, the dotted outline of each block indicates a group of registers and not a single physical entity. Each of the a symbols represents two separate accumulators, one for real values and one for imaginary values, and there is one such pair for every bit of registers 201. In the particular implementation described here, these accumulators are 16-bit values which are mapped in pairs, real and imaginary, onto thirty-two bit physical registers, one such register holding the real sum in the bottom 16 bits, and the imaginary sum in bits 17 to 32. Other arrangements are possible, and the choice depends on what is available and computationally efficient. The widths of the accumulators depend on the coherent integration period. On the assumption that an integer number P of 2048-blocks of data samples are used, corresponding to P ms of coherent integration, the maximum accumulated value is 2048×P. For example, 10 ms integration period would require at least 15 bits in each of the real and imaginary accumulators.

Figure 4:
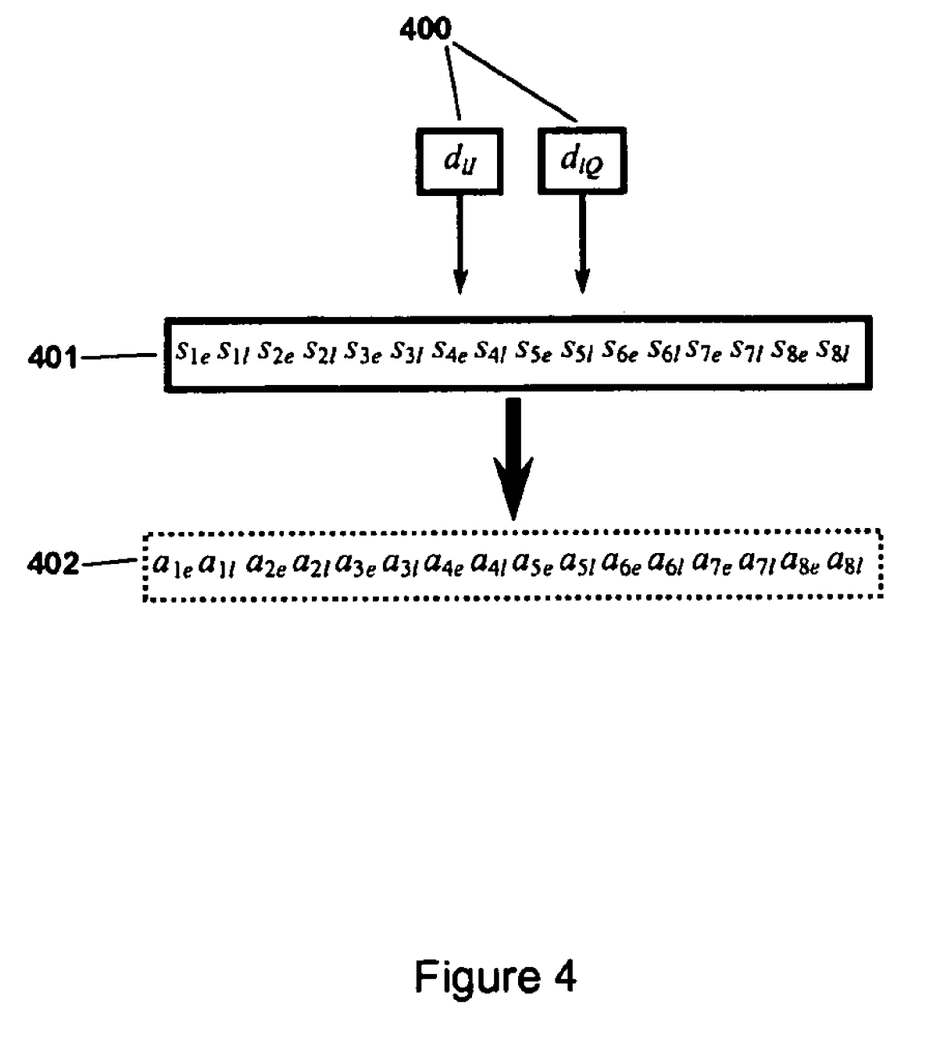
FIG. 4 shows bit settings in registers for tracking.

Having acquired sufficient satellites, a GPS receiver normally enters one or more tracking modes in which it uses tracking loops to estimate the error between a locally-generated satellite code replica and the received signal from each of the satellites at the input of an error detector. The filtered error signal is used to reduce, and mostly eliminate, the error between the generated satellite code replica and the received signal. In the case of maintaining the tracking of the satellite signal replica, this is often accomplished through performing the cross-correlation of the incoming received signal samples with satellite signal replica samples positioned each side of the tracked position, corresponding to at least one early version of the code and one late version. In this embodiment, two satellite signal replica samples are used, corresponding to one sample timed to be half a chip before the tracked position (labelled early, e), and one sample timed to be half a chip after the tracked position (labelled late, l). The corresponding bit settings are shown in FIG. 4. The tracked position is labelled prompt, p. The early and late satellite signal replica samples for satellite m are therefore given by $s_{me}=s_{mp-1}$ and $s_{ml}=s_{mp+1}$. The lower 16 bits of a single 32-bit register 401 in processor 105 is filled with the early and late satellite signal replica samples for each of the eight satellites used in the acquisition stage discussed above. The exclusive-OR operation (FIG. 3) is then carried out with each I and Q signal sample bit 400 and the results accumulated in the accumulators 402 (in processor 105). The accumulated totals are used by the processor 105 to control the satellite signal replica positions with respect to the received signal samples for each of the satellites 101. This type of tracking process is well-known in the art as a delay lock loop (DLL).

Estimates of the frequency error between the received signal samples and a replica of the received carrier frequency can also be made. The respective accumulation sums for $d_{iI}$ and $d_{iQ}$, after correlation with prompt timed samples of the satellite signal replica, are passed to an angle detector (not shown). The angle detector can take many forms as can be found in Parkinson and Spilker. One such method uses a four-quadrant arc-tangent function to estimate the angle between the received and replica samples. The angular error is filtered and used to correct the carrier replica frequency. This operation can be used over the period of one data element as transmitted by the satellite. If filtering for a longer duration is required, modifications to the angle detector are needed to accommodate changes in the state of the transmitted data bit from the satellite. An example of one such procedure is well known in the art as a "Costas loop". A two-arm Costas loop can correct for binary phase shift keyed data as is used in most GNSS data transmission formats including GPS.

The invention claimed is:

1. A method of processing received satellite radio navigation signals, comprising the steps of
   receiving the radio navigation signals from plural satellites through a common antenna;
   digitising the received radio navigation signals to produce a time-series of digitised signal samples;
   obtaining a plurality of replicas representing the radio navigation signals of each of said plurality of satellites;
   selecting at least one sample from each of said replicas;
   setting elements of a register equal to said selected replica samples corresponding to said plurality of satellites; and
   in turn, for each one of said digitised signal samples,
      combining the value of said digitised signal sample with each of the values of the elements of the register to produce corresponding modified values; and
      accumulating the modified values corresponding to each of said register elements.

2. A method according to claim 1, wherein digitisation of the received radio navigation signal is carried out after mixing to baseband, or at an intermediate frequency, or is carried out directly at the received radio frequency.

3. A method according to claim 2, wherein the digitised samples are multi-bit samples produced at a first sampling rate which are subsequently reduced in precision and decimated to produce samples with only one or a few bits of precision at a lower sampling rate.

4. A method according to claim 2 or claim 3, wherein separate digital data streams are produced representing I and Q signals, which are kept separate, or interleaved, or otherwise combined into a single data stream.

5. A method according to claim 4, wherein each I and Q data sample is made at the same time.

6. A method according to claim 4, wherein a single digitiser produces interleaved I and Q samples directly by sampling at two instances spaced a quarter of a cycle apart.

7. A method according to claim 1, wherein the radio receiver operates on more than one frequency channel simultaneously.

8. A method according to any of claims 1 to 3 and 7, in which the satellite radio navigation signal replica samples are loaded into the elements of one or more registers, so that each register contains replica samples from plural satellites.

9. A method according to claim 1, further including the step of processing the accumulated values to determine the position of the common antenna.

10. A method according to claim 1, wherein the received satellite radio navigation signals are received by an antenna connected to a hardware device and either stored in memory for later processing or processed immediately by a software or firmware program running on a processor either in digital or analogue form.

11. Apparatus for processing received satellite radio navigation signals, comprising
   a common antenna (102);
   a processor (103) for receiving the radio navigation signals from plural satellites through the common antenna;
   a digitiser (104) for digitising the received radio navigation signals to produce a time-series of digitised signal samples;
   a processor (105) for:
      obtaining a plurality of replicas representing the radio navigation signals of each of said plurality of satellites;
      for selecting at least one sample from each of said replicas;
      for setting elements of a register (201-1, 201-2, . . . 201-512) equal to said selected replica samples corresponding to said plurality of satellites; and
      in turn, for each one of said digitised signal samples,
         combining the value of said digitised signal sample with each of the values of the elements of the register to produce corresponding modified values; and
         accumulating the modified values corresponding to each of said register elements.

* * * * *